United States Patent
Ingram

(10) Patent No.: US 7,084,973 B1
(45) Date of Patent: Aug. 1, 2006

(54) VARIABLE BINNING CCD FOR SPECTROSCOPY

(75) Inventor: Simon Gareth Ingram, Waterloo (CA)

(73) Assignee: Dalsa Inc., Waterloo (CA)

( * ) Notice: Subject to any disclaimer, the term of this patent is extended or adjusted under 35 U.S.C. 154(b) by 298 days.

(21) Appl. No.: 10/457,461

(22) Filed: Jun. 10, 2003

Related U.S. Application Data

(60) Provisional application No. 60/387,395, filed on Jun. 11, 2002.

(51) Int. Cl.
*G01J 3/28* (2006.01)

(52) U.S. Cl. ...................................... 356/326
(58) Field of Classification Search ................ 356/326, 356/512; 257/236, 232, 98; 382/288; 250/208, 250/458, 459; 348/295, 302
See application file for complete search history.

(56) References Cited

U.S. PATENT DOCUMENTS

| | | | |
|---|---|---|---|
| 5,235,402 A | 8/1993 | Prytherch | |
| 5,510,894 A | 4/1996 | Batchelder et al. | |
| 5,689,333 A | 11/1997 | Batchelder et al. | |
| 5,773,832 A | 6/1998 | Sayed et al. | |
| 5,873,054 A | 2/1999 | Warburton et al. | |
| 5,892,541 A * | 4/1999 | Merrill ....................... | 348/302 |
| 5,909,026 A * | 6/1999 | Zhou et al. ............... | 250/208.1 |
| 5,973,311 A | 10/1999 | Sauer et al. | |
| 5,990,503 A * | 11/1999 | Ingram et al. .............. | 257/236 |
| 6,038,023 A | 3/2000 | Carlson et al. | |
| 6,057,539 A * | 5/2000 | Zhou et al. ............... | 250/208.1 |
| 6,344,666 B1 * | 2/2002 | Yamaguchi et al. .......... | 257/98 |
| 6,519,371 B1 * | 2/2003 | Pain et al. .................. | 382/288 |
| 6,563,539 B1 * | 5/2003 | Lefevre ...................... | 348/295 |
| 6,633,058 B1 * | 10/2003 | O. et al. ..................... | 257/232 |
| 2002/0030824 A1 * | 3/2002 | Wirth ......................... | 356/512 |

* cited by examiner

*Primary Examiner*—Gregory J. Toatley, Jr.
*Assistant Examiner*—Ali Allawi
(74) *Attorney, Agent, or Firm*—Millen, White, Zelano & Branigan, P.C.

(57) ABSTRACT

An apparatus includes a source of spectral light indicative of a sample to be measured, a camera to sense a spectrum, and a chromatic dispersion device to spatially separate light from the sample to be measured into the spectrum. The camera includes a sensor and control circuitry. The sensor is one of a CCD line sensor and a CCD TDI sensor. The sensor includes a plurality of pixels, a conversion node, a readout register coupled to the conversion node and a reset gate coupled to the conversion node. The control circuitry is capable of shifting the readout register to transfer charges onto the conversion node and capable of controlling the reset gate to reset the conversion node at varying intervals enabling the conversion node to integrate charges from a varying number of elements of the readout register.

20 Claims, 3 Drawing Sheets

VARIABLE BINNING CCD FOR SPECTROSCOPY

The priority benefit of the Jun. 11, 2002 filing date of provisional application Ser. No. 60/387,395 is hereby claimed.

BACKGROUND OF THE INVENTION

1. Field of the Invention

The present invention relates to CCD sensors used for spectroscopy. In particular, the invention relates to a variable binning approach.

2. Description of Related Art

It is desired to provide a sensor that meets requirements for wide dynamic range detection over a wide spectral range at relatively high speed. Known approaches have tried to achieve these requirements using photo-multipliers, long integration timers, slow data readout or multiple exposure arrangements, all of which are quite costly.

U.S. Pat. No. 6,038,023 to Carlson et al. describes a programmable CMOS spectrometer which can be programmed to control spectral resolution. A set of pixels, not necessarily contiguous, or spectral bands are selected by writing a bit pattern to the control register that controls a switch so that photocurrents of the selected pixels are summed. U.S. Pat. No. 5,973,311 to Sauer, et al. describes an active pixel array with high and low resolution modes. In a low resolution mode, adjacent pixel elements, that are selected by row and column control lines, are coupled together through a switch to sum together their respective charges. However, the sensor resolution is not controlled by timing the reset of a sense node of a CCD readout structure.

U.S. Pat. No. 5,689,333 to Batchelder, et al. describes a spectrometer with a two dimensional CCD coupled to a computer for subsequent data processing. If the highest possible spectral resolution is not required, the software can use a technique called "binning," in which several adjacent pixels are treated as a group. The software adds together the data which it captures from the consecutive pixels in the group, and treats the result as one data point.

U.S. Pat. No. 5,235,402 to Prytherch describes a spectrometer that uses a two dimensional CCD array where the output shift register is connected to an output circuit. Charges in the shift register are feed to a capacitor in the output circuit which can be periodically reset so that a standard CCD array can be tailored to the optical system used, and only those elements that are illuminated need be read out. However, the resetting is not controlled to enable the capacitor to integrate charges from a varying number of elements of the output shift register.

What is needed is wide dynamic range detection over a wide spectral range at relatively high speed at a relatively low cost.

SUMMARY OF THE INVENTION

In one embodiment of the invention, an apparatus includes a source of spectral light indicative of a sample to be measured, a camera to sense a spectrum, and a chromatic dispersion device to spatially separate light from the sample to be measured into the spectrum. The camera includes a sensor and control circuitry. The sensor is one of a CCD line sensor and a CCD TDI sensor. The sensor includes a plurality of pixels, a conversion node, a readout register coupled to the conversion node and a reset gate coupled to the conversion node. The control circuitry is capable of shifting the readout register to transfer charges onto the conversion node and capable of controlling the reset gate to reset the conversion node at varying intervals enabling the conversion node to integrate charges from a varying number of elements of the readout register.

In an alternative embodiment of the invention, an apparatus includes a source of spectral light indicative of a sample to be measured, a camera to sense a spectrum, and a chromatic dispersion device to spatially separate light from the sample to be measured into the spectrum, where the camera includes a sensor, an analog to digital converter and control circuitry. The sensor is one of a CCD line sensor and a CCD TDI sensor. The sensor includes a plurality of pixels, a conversion node, a readout register coupled to the conversion node and an output buffer coupled to the conversion node. The analog to digital converter is coupled to the output buffer. The control circuitry is coupled to the sensor and the analog to digital converter so as to be capable of shifting the readout register to transfer charges through the conversion node and through the output buffer to the analog to digital converter. The control circuitry integrates a varying number of digital outputs from the analog to digital converter where the integrated digital outputs corresponding to a varying number of elements of the readout register.

In another embodiment of the invention, a method includes shifting a readout register of a sensor to transfer charges onto a conversion node, the sensor being one of a CCD line sensor and a CCD TDI sensor. The method further includes controlling a reset gate of the sensor to reset the conversion node at varying intervals enabling the conversion node to integrate charges from a varying number of elements of the readout register.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The features and performance of a CCD camera for meeting the requirements of a broadband optical spectrometer are discussed below. The main requirements are low noise and wide dynamic range. Representative uses are sensitive to the unit cost of the camera. As discussed herein, single camera is employed with time multiplexing for the active and reference optical signals.

A variable binned CCD sensor offers a faster data rate with a single exposure solution than is provided by known approaches to a solid state spectrometer sensor.

Figure 1:
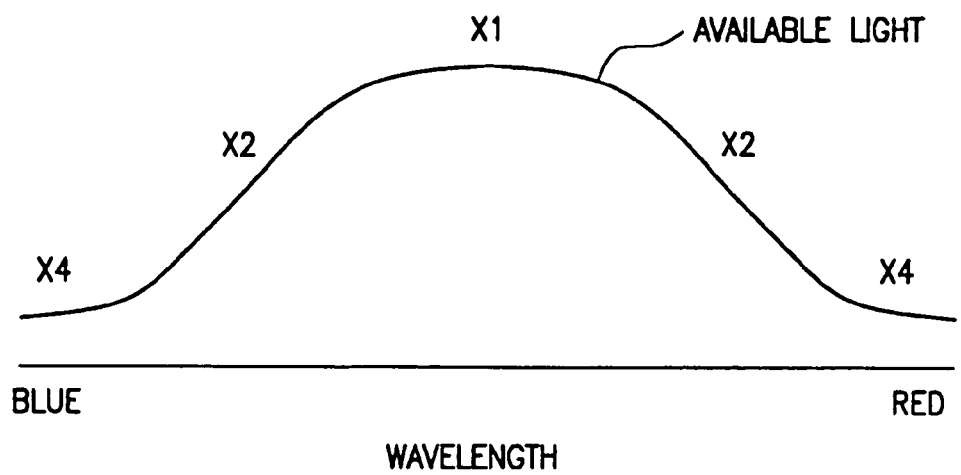
FIG. 1 is a spectrum graph depicting exemplary binning regions according to the present invention.

Binning of pixels allows small signals to be added in the charge domain with little or no degradation to the SNR. A CCD image sensor has maximum sensitivity in the visible spectrum as depicted in FIG. 1, and relatively low sensitivity in the deep ultraviolet (DUV) and near infrared (IR) spectra.

By binning pixels that are used to image at these short and long wavelengths (e.g., combining charges from adjacent pixels), the effective sensitivity and SNR of the sensor can be improved. FIG. 1 shows a representative 4× binning at the DUV and near IR wavelengths and 2× binning at intermediate wavelengths between the center of the visible spectrum and the DUV and near IR wavelengths. The tradeoff is a reduction in the wavelength resolution at short and long wavelengths. In many applications, this will be an acceptable tradeoff. Since this invention permits the sensor to be designed with a programmable or variable pattern of binning, the application of this invention is flexible and cost effective.

Figure 2:
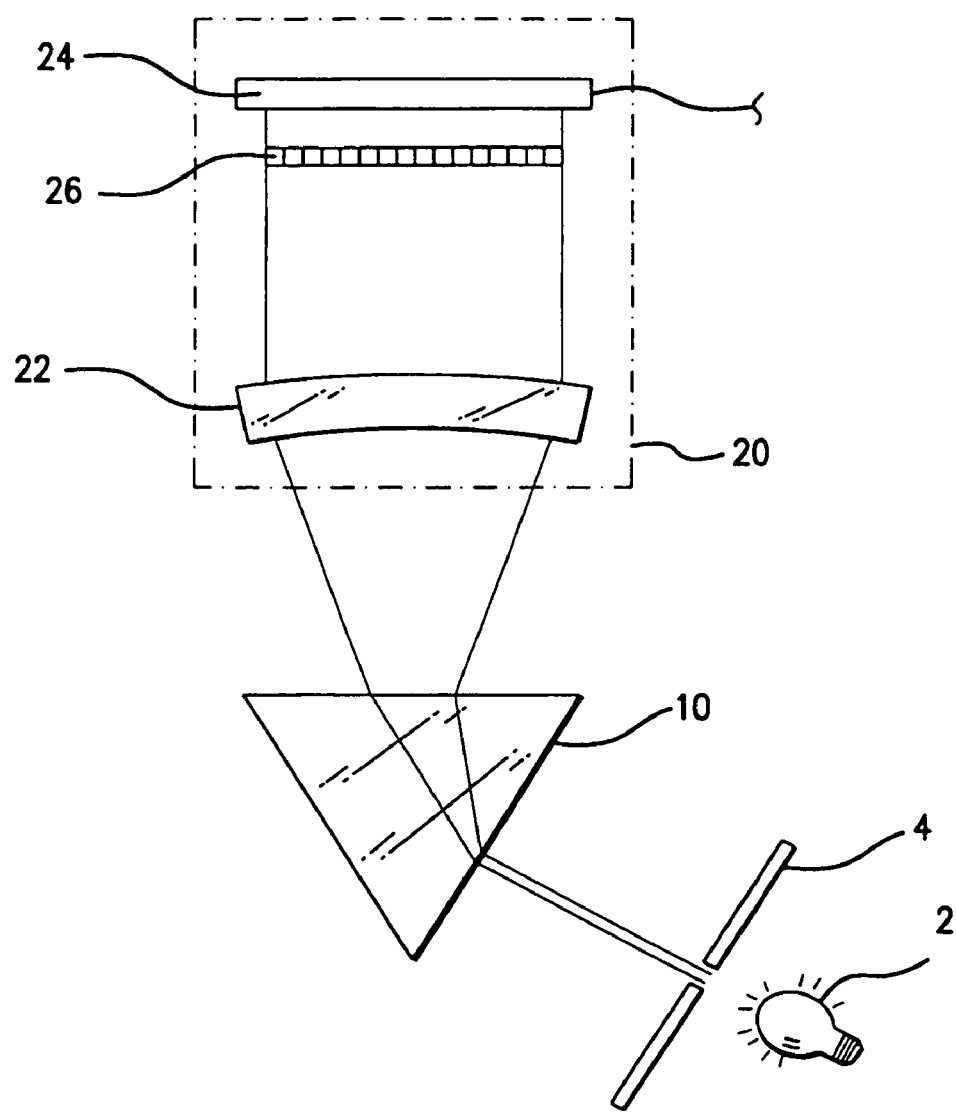
FIG. 2 is a schematic depicting elements of a spectrometer according to the present invention.

In FIG. 2, an apparatus includes a source 2 of spectral light indicative of a sample to be measured, a camera 20 to sense a spectrum of the spectral light, and a chromatic dispersion device 10 to spatially separate the spectral light into the spectrum to be sensed by the camera. The camera includes control circuitry and either a CCD line sensor or a CCD TDI sensor.

Figure 3:
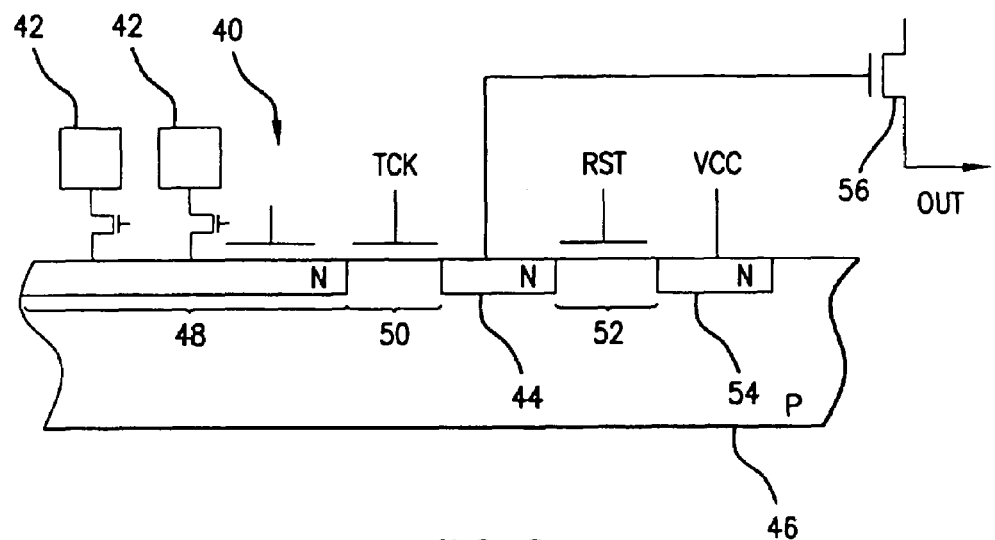
FIG. 3 is a schematic diagram and section view depicting elements of a sensor according to the present invention.

In FIG. 3, the sensor includes a plurality of pixels 42, a conversion node 44 formed in a substrate 46, a readout register 48 coupled to the conversion node through a transfer gate 50 clocked by a transfer clock TCK, a reset gate 52 clocked by the reset clock RST and coupled between the conversion node and drain 54 (coupled to a positive drain potential), and a source follower 56 coupled to the conversion node. The control circuitry (either on the sensor chip or external to the sensor chip) provides the reset signal RST to control the reset gate and provides the transfer clock signal TCK to control transfer of the charge from the readout register into the conversion node 44 so as to reset the conversion node at varying intervals enabling the conversion node to integrate charges from the readout register representing a varying number of pixels from the plurality of pixels.

Figure 4:
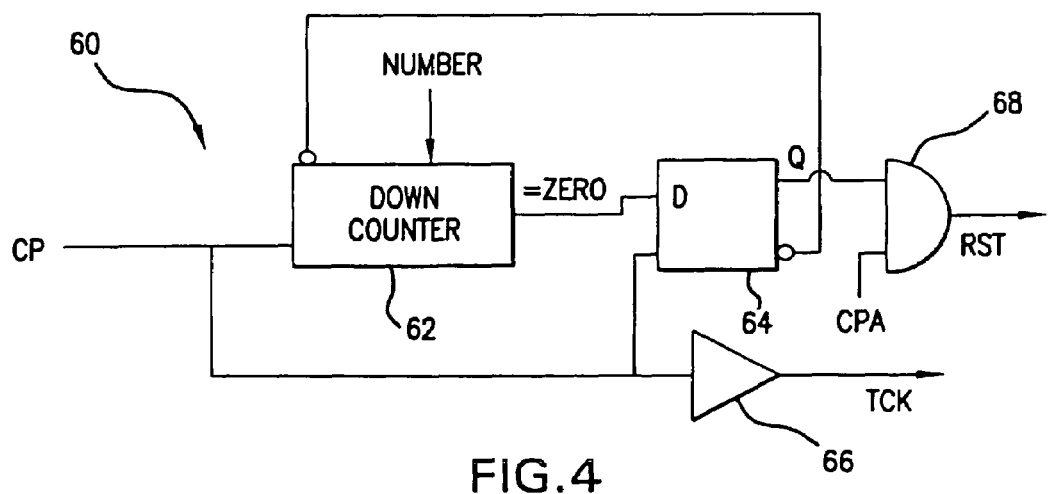
FIG. 4 is a schematic diagram depicting elements of exemplary control circuitry according to the present invention; however, other control circuits could be used to control the binning as discussed herein.

FIG. 4 is an example of such control circuitry 60, and control circuitry 60 in this example includes down counter 62, D flip-flop register element 64, driver 66 and AND gate 68. In operation, clock pulse CP clocks the down counter to count down to zero at the same rate as the rate of the clocks that shift the readout register. In fact, clock pulse CP may be one of the phases of the readout register so that it can be buffer in driver 66 and provided as transfer clock TCK to the transfer gate. However, it is only when down counter 62 reduces its count to zero that the D flip-flop is set to provide the signal Q so as to reset conversion node 44. Also, when signal Q is provided, a NUMBER is set into down counter 62 for the next down count cycle. Thus, when the NUMBER is, for example 2, signal Q will be a 50% duty cycle square wave. Signal Q is combined in a logical AND with another clock pulse from the clocks that drive the readout register to produce reset clock RST. When the NUMBER is 2, then there will be two TCK clocks for each RST clock, and the signal output from the source follower 56 will be the voltage counterpart of the charge from first one element then the combination of two elements of the readout register. In a similar manner, if the NUMBER where three, three elements of the readout register would be combined on the conversion node 44 before conversion node 44 is reset.

An embodiment of the invention provides the NUMBER from a table of numbers that depends on which pixels are being transferred by clock TCK as is further described below. For example, a look up table provides the value of NUMBER for each register element being read out of the register. The readout register element number is used as an address into the table, and the value stored in the look up table at that address is provided to counter 62 as the value of NUMBER to be loaded into the counter the next time D flip flop 64 is set. Many different circuits may be used to provide the basic functions of control circuitry 60. For example, microprocessors or application specific integrated circuits (ASICs) may be used instead individual circuit components. Control circuitry 60 may be included directly on a silicon integrated circuit wafer in which the sensor 40 is formed. In all variants, control circuitry 60 cause the readout register to transfer charges by shifting onto the conversion node and causes the reset gate to reset the conversion node at varying time intervals enabling the conversion node to integrate charges from a varying number of elements of the readout register.

In an exemplary application illustrated by FIG. 2, light source 2 provides light through aperture 4 into prism 10. Prism 10 disperses the light spectrally into a spectrum of its characteristic colors. Prism 10 may, of course, be replaced by a diffraction grating arrangement or any other structure with a chromic dispersion property. The spectrum is captured and recorded by camera 20. Camera 20 includes optical arrangement 22 (lenses, mirrors and prisms), and semiconductor sensor 24. Semiconductor sensor 24 is of the line scan (or TDI scan) type and includes a plurality of pixels. The pixels are arranged an array oriented so that different portions of the spectrum (see 26) impinge on different pixels. In this way, a signal received by a particular pixel corresponds to the light from a particular narrow band of wavelengths. Camera 20, or the spectrometer as a whole, may include additional slit apertures (not shown for simplicity), as are typical of known spectrometers. The camera may be used in either absorption or reflection spectrometry. Absorption spectrometry samples may be disposed between aperture 4 and prism 10. Reflection spectrometry samples may be disposed relative to light source 2 so that the reflected light is collimated by aperture 4. Persons skilled in the art will appreciate how such arrangements may be made. Furthermore, by placing multiple samples on a conveyor, multiple samples may be spectrally measured at a rate defined by the speed of the conveyor.

An exemplary sensor 24 includes a linear array of 3072 photodiodes (or pinned photodiodes) measuring 10 micrometers pitch along the linear array by 500 micrometers transverse to the linear array. Sensor 24 also includes transfer circuitry and a readout register that preferably employs 4-phase clocking for maximum storage capacity and minimal clock feed through to the output video. In such an embodiment, the readout register includes a four phase clocking structure. The end of the readout register is coupled to a conversion node, sometimes called a sense node.

The conversion node, sometimes called a sense node, is used to convert charges into voltage. A conversion node includes a diffusion or implant region having a specific characteristic capacitance. The charge Q on the capacitance C defines a voltage V. The voltage V is then sensed by an output buffer, for example, a transistor source follower circuit. The conversion node typically has a reset gate coupled to a drain to drain or reset the charge on the node.

In operation, charges integrated in a linear array of photodiodes (or pinned photodiodes) or accumulated in a TDI array are transferred to the readout register while the conversion node is drained of all mobile charges through the reset gate. Then, charges in the CCD readout register are shifted onto the conversion node, converted to a voltage, and sensed by a buffer such as a transistor source follower circuit. In known sensors, the charge on the conversion node is drained away through the reset gate after each register element is sensed by the source follower. However, according to the present invention, charge from two or more readout register elements are combined on the conversion node before any charge is drained away through the reset gate. In fact, the number of readout register elements that are combined on the conversion node is variable.

In particular, the readout register of the sensor is shifted to transfer charges onto a conversion node at a shift rate. The control circuitry controls a reset gate of the sensor to reset the conversion node at varying intervals enabling the conversion node to integrate charges from a varying number of elements of the readout register. As an example, charge from only one readout register element is held on the conversion node before the conversion node is reset when the one readout register element corresponds to a central pixel of the sensor, and charges from at least two sequential readout register elements are combined on the conversion node before the conversion node is reset when the other register elements correspond to non central pixels of the sensor.

Control circuitry (either on the sensor chip or off of the sensor chip) that generates a signal applied to a gate electrode of the reset gate actually defines how often the conversion node is reset. If the camera optics, dispersion prism and the photodiode array are arranged so that a wavelength shift of $\frac{1}{7}^{th}$ of a nanometer causes the light to fall on an adjacent pixel, and if the conversion node is reset every time a readout register element is sensed by the source follower, the spectral resolution will be $\frac{1}{7}^{th}$ of a nanometer (i.e., as represented by a single readout register element). On the other hand, if the conversion node is reset every other time a readout register element is sensed by the source follower, the spectral resolution will be $\frac{2}{7}^{th}$ of a nanometer. If the conversion node is reset every third time a readout register element is sensed by the source follower, the spectral resolution will be $\frac{3}{7}^{th}$ of a nanometer, and so fourth.

The spectrometer preferably operates over the range from 360 nm to 800 nm with a resolution of at least 1 nm. This is ideally suited to a silicon CCD image sensor that employs photodiode detectors (or pinned photodiodes) in a line scan architecture. However, a TDI architecture will work as well, when an image conjugate of the spectrum is scanned relative to the TDI sensor in the direction of charge propagation in the TDI sensor. An exemplary sensor has a resolution of 4055 pixels. Camera optics, including chromatic dispersion prism, are arranged so that, at a pixel pitch, each pixel represents a bandwidth of 0.143 nm (e.g., adjacent pixels detect light at wavelengths of the spectrum separated by 0.143 nm). An illumination source provides illumination in a range of, for example, from 400 nm to 900 nm.

The samples to be measured might be arranged in batches of 48, which are moved through the spectrometer such that each one sample is available for measurement every 20 ms. In an example, each sample is measured 10 times. For each such measurement, a corresponding reference light beam is also measured. If each sample is measured 10 times, then allowing for time multiplexing of the reference and signal beams, there will be 20 sets of data captured for each sample. The CCD sensor will be required to sample a line of the spectrum (e.g., from about 360 nm to 800 nm) at a rate of at least 1 kHz per spectral line. Each batch of sample will produce 960 lines of captured data at a system level.

A representative camera uses a sensor with a linescan architecture and a linear response pinned photodiode pixel (or possibly a linear response photodiode pixel). A representative pixel size is 500 sq. μm, with a typical aspect ratio of 40 μm by 12.5 μm. A tall orientation is preferred to achieve a 12.5 μm pixel to pixel spacing; however, when the orientation is tall, one must recognize that the line transfer time into the readout register may be lengthened. The number of pixels, including image length of this exemplary sensor is 4096 but only 4055 pixels are part of the active pixel array. Thus, the active pixel array length extends 50.7 mm. In this exemplary sensor, the readout register is designed to readout at a 5 MHz data rate and the total readout time is 820 μs. Allowing 180 μs to transfer a line of pixels to the readout register enables the sensor to be operated at a maximum line rate of 1 kHz. The operation of this sensor enables the variable binning to increase responsivity as a tradeoff to spectral resolution.

The extinction curve (amount of light absorbed by the liquid samples under test) is described by:

$A = \log(\Phi_{in}/\Phi_{ext})$, where $\Phi_{in}$=input flux, $\Phi_{ext}$=output flux In this example, there is a strong peak in the characteristic illumination curve in the range of 500 nm to 600 nm with small diminishing tails at shorter and longer wavelengths. The need to recover information from both the tails and the peak gives rise to the wide dynamic range detection requirement (ideally 20 bits equivalent digitization).

The disclosed scheme is to tradeoff resolution in the wavelength domain (at red and blue extremes of the spectrum) in return for improved signal to noise ratio at short and long wavelengths. This is done using variable pixel binning in which a charge signal is summed on the charge conversion node without impact on the noise performance.

The camera's optics is designed to provide a resolution of 0.143 nm per pixel, which allows up to 6× binning (6 adjacent pixel channels) before the wavelength resolution exceeds 1 nm. However, at very short and very long wavelengths, the extinction is very small indeed. The wavelength resolution needs to be allowed to degrade to 4.6 nm to allow for 32× binning (32 adjacent pixel channels). The use of 32× binning for the very short and long wavelengths extends the effective dynamic range to 19 bits without introducing any non-linearity. At moderately long and short wavelengths the binning ratio would be reduced until for the center of the spectrum there would be no binning (i.e., each readout register element representing a 0.143 nm band would be independently readout). The table below provides an example of how this could be configured; however, the final configuration is optimized for the intended application. The number of pixels binned together in any wavelength range depends on the expected intensity of the particular spectrum to be measured and the desired resolution.

TABLE I

Representative Wavelength Resolution

| Wavelength Range (nm) | Binning | Resolution (nm) |
| --- | --- | --- |
| 360–370 | 32× | 4.6 |
| 370–410 | 7× | 1.000 |
| 410–420 | 6× | 0.860 |
| 420–430 | 5× | 0.716 |
| 430–440 | 4× | 0.563 |
| 440–450 | 3× | 0.430 |
| 450–465 | 2× | 0.286 |
| 465–570 (center) | 1× | 0.143 |
| Repeat for Longer Wavelengths | | |

A sensor for a spectrometer with the above described binning, provides greater spectral resolution from 465–570 nm than the spectral resolution it provides from 360 to 370 nm. In the spectrum from 465–570 nm, 35 pixel channels are output from the source follower representing spectrum sampling at wavelength intervals separated by 0.143 nm.

In the spectrum from 450–465 nm, 52 or 53 (e.g., 105/2) pixel channels are output from the source follower representing spectrum sampling at wavelength intervals separated by 2 times 0.143 nm. In operation, the reset gate electrode is reset every other time a readout register element is sensed by the source follower to combine 2 adjacent pixels on the conversion node. The samples output from the source follower represent spectrum sampling at wavelength intervals separated by 2 times 0.143 nm (i.e., a spectral resolution of $2/7^{th}$ of a nanometer).

In the spectrum from 440–450 nm, 23 or 24 (e.g., 10*7/3) pixel channels are output from the source follower representing spectrum sampling at wavelength intervals separated by 3 times 0.143 nm. In operation, the reset gate electrode is reset every third time a readout register element is sensed by the source follower to combine 3 adjacent pixels on the conversion node. The samples output from the source follower represent spectrum sampling at wavelength intervals separated by 3 times 0.143 nm (i.e., a spectral resolution of $3/7^{th}$ of a nanometer).

In the spectrum from 430–440 nm, 17 or 18 (e.g., 10*7/4) pixel channels are output from the source follower representing spectrum sampling at wavelength intervals separated by 4 times 0.143 nm. In operation, the reset gate electrode is reset every fourth time a readout register element is sensed by the source follower to combine 4 adjacent pixels on the conversion node. The samples output from the source follower represent spectrum sampling at wavelength intervals separated by 4 times 0.143 nm (i.e., a spectral resolution of $4/7^{th}$ of a nanometer).

In the spectrum from 420–430 nm, 14 (e.g., 10*7/5) pixel channels are output from the source follower representing spectrum sampling at wavelength intervals separated by 5 times 0.143 nm. In operation, the reset gate electrode is reset every fifth time a readout register element is sensed by the source follower to combine 5 adjacent pixels on the conversion node. The samples output from the source follower represent spectrum sampling at wavelength intervals separated by 5 times 0.143 nm (i.e., a spectral resolution of $5/7^{th}$ of a nanometer).

In the spectrum from 410–420 nm, 11 or 12 (e.g., 10*7/6) pixel channels are output from the source follower representing spectrum sampling at wavelength intervals separated by 6 times 0.143 nm. In operation, the reset gate electrode is reset every sixth time a readout register element is sensed by the source follower to combine 6 adjacent pixels on the conversion node. The samples output from the source follower represent spectrum sampling at wavelength intervals separated by 6 times 0.143 nm (i.e., a spectral resolution of $6/7^{th}$ of a nanometer).

In the spectrum from 370–410 nm, 40 (e.g., 40*7/7) pixel channels are output from the source follower representing spectrum sampling at wavelength intervals separated by 7 times 0.143 nm (i.e., 1 nm). In operation, the reset gate electrode is reset every seventh time a readout register element is sensed by the source follower to combine 7 adjacent pixels on the conversion node. The samples output from the source follower represent spectrum sampling at wavelength intervals separated by 6 times 0.143 nm (i.e., a spectral resolution of 1 nanometer).

In the spectrum from 360–370 nm, 2 or 3 (e.g., 10*7/32) pixel channels are output from the source follower representing spectrum sampling at wavelength intervals separated by 32 times 0.143 nm (e.g., 4.6 nm). In operation, the reset gate electrode is reset every $32^{nd}$ time a readout register element is sensed by the source follower to combine 32 adjacent pixels on the conversion node. The samples output from the source follower represent spectrum sampling at wavelength intervals separated by 32 times 0.143 nm (i.e., a spectral resolution of $32/7^{th}$ of a nanometer or about 4.6 nm).

The degree of sampling within particular band will be dependent on the desired dynamic range of detection within the band. This embodiment enables easy tradeoffs between dynamic range and spectral sampling resolution.

An alternative to combining charges on a sense node is digitizing all pixels and then later combining the signals in a computer or microprocessor or application specific integrated circuit (ASIC). However, this scheme introduces digital noise which raises the noise floor, particularly in the DUV and IR spectrums where the detection of low levels of photon flux is already challenging. In this alternative embodiment, the apparatus includes a source 2 of spectral light indicative of a sample to be measured, a camera 20 to sense a spectrum, and a chromatic dispersion 10 device to spatially separate light from the sample to be measured into the spectrum. The camera includes a sensor, an analog to digital converter and control circuitry. The sensor is one of a CCD line sensor and a CCD TDI sensor. The sensor includes a plurality of pixels, a conversion node, a readout register coupled to the conversion node and an output buffer coupled to the conversion node. The analog to digital converter is coupled to the output buffer. The control circuitry couples to the sensor and the analog to digital converter to shift the readout register so as to transfer charges through the conversion node and through the output buffer to the analog to digital converter. The control circuitry also integrate a varying number of digital outputs from the analog to digital converter so that the integrated digital outputs correspond to a varying number of elements of the readout register. Such control circuitry may be implemented with a microprocessor, application specific integrated circuit (ASIC) or discrete circuit components. The control circuitry may be implemented with the sensor in a single silicon integrated circuit, or alternatively, it may be implemented on a printed wiring assembly on which the sensor is also mounted.

As an alternative, mixed pixel architectures might be employed where the size of the pixels across the linear array are varied (to vary sensitivity) in addition to varying the number of readout register elements integrated on a conversion node before sensing by an output buffer such as a source follower. For example, the sensor includes a plurality of pixels, and the plurality of pixels includes central pixels and end pixels. The central pixels are characterized by a first photo responsive area. The end pixels are characterized by a second photo responsive area. The first photo responsive area is smaller than the second photo responsive area. In operation, the shifting of the readout register shifts central elements of the readout register corresponding to the central pixels and end elements of the readout register corresponding to end pixels. The central elements readout pixels that are characterized by the first photo responsive area. The end elements readout pixels that are characterized by the second photo responsive area.

The extinction curve discussed above, has a broad but pronounced peak in the range between 500 nm and 600 nm. This peak is large when compared with the tails, placing a heavy burden on the camera and sensor design to achieve a wide dynamic range. The center pixels of the sensor will therefore be expected to collect a large fraction of their saturation signal level. However, the signal to noise ratio for high illumination levels is limited by the signal shot noise (square root of photon flux). The use of high bit depth digitization is unwarranted in this case.

The sensor pixels in the center of the image spectrum are designed with a lower QE than the other pixels in order to reduce the possible range of pixel signal levels across the sensor (e.g., by using a poly silicon over layer to absorb some light or using smaller pixels to detect less light in first place). This reduces the burden on the signal chain and allows the effective dynamic range of the system to be further improved. In an example, central pixels of the plurality of pixels are characterized by a first quantum efficiency. End pixels of the plurality of pixels are characterized by a second quantum efficiency. The first quantum efficiency is smaller (i.e., lower) than the second quantum efficiency. In operation, the shifting of the readout register shifts the central elements and the end elements. The central elements readout pixels that are characterized by the first quantum efficiency, and the end elements readout pixels that are characterized by the second quantum efficiency.

Reducing the effective QE by a factor of 2 would extend the effective dynamic range providing that there is sufficient light to take advantage of the pixel full well capacity. This, in combination with the disclosed binning, would allow the spectrometer camera to achieve the desired wide dynamic detection range of 20 bits.

In this application, the camera provides a wide dynamic range over a wide range of illumination wavelengths. Therefore the minimum amount of light required to operate the sensor, the maximum amount of light that can be tolerated and the sensitivity to light are very important parameters. This is the optical performance of the sensor.

The optical performance is characterized by three parameters, the noise equivalent exposure (NEE), the saturation equivalent exposure (SEE) and the responsivity. They are all critical for proper system design and should be examined carefully. As these parameters are wavelength dependent, they are normally measured and reported at specific wavelengths, or as a function of wavelength in the form of a spectral response curve. This enables the performance of the sensor or camera to be related to any illumination source that might be encountered by the end user.

The noise equivalent exposure (NEE) is the level of illumination that when applied uniformly at the sensor will produce an output signal equal to the sensor rms noise level. A sensor is unable to resolve information at or below this level of illumination. Hence, the NEE places a constraint on the minimum illumination level required by a system for a particular frame rate. The NEE is usually calculated based on known methodologies and measurements of the sensor conversion efficiency.

The saturation equivalent exposure (SEE) is the level of illumination that will produce an output signal equal to the saturation output of a sensor when the illumination is applied uniformly at the sensor. A sensor is unable to provide a response to illumination above this level without degrading its response linearity. The maximum illumination level that can be tolerated in a system for a particular line rate is thus constrained by the SEE.

The dynamic range of a sensor can be calculated as the ratio SEE:NEE. This ratio is a direct measure of the intrinsic rms dynamic range of the sensor.

The change in the output signal for a given change in the illumination at a sensor is a measure of the sensor responsivity. A sensitive conversion node (e.g., a low capacitance node) in a sensor's output can be employed to maximize the responsivity.

An overall sensitivity of a camera is determined by the responsivity of its sensor together with any A/D conversion gain. The sensitivity of the camera will change if an in-camera A/D conversion gain is increased or decreased to accommodate a different saturation level from the sensor. Where the full dynamic range is not utilized because the light source is insufficient to allow saturation to be reached, the sensitivity of a camera can be improved by increasing the A/D conversion gain.

Having described preferred embodiments of a novel variable binning spectroscopy CCD sensor (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. An apparatus comprising a source of spectral light indicative of a sample to be measured, a camera to sense a spectrum, and a chromatic dispersion device to spatially separate light from the sample to be measured into the spectrum, wherein the camera includes:
    a sensor that is one of a CCD line sensor and a CCD TDI sensor, the sensor including a plurality of pixels, a conversion node, a readout register coupled to the conversion node and a reset gate coupled to the conversion node; and
    control circuitry capable of shifting the readout register to transfer charges onto the conversion node and capable of controlling the reset gate to reset the conversion node at varying intervals enabling the conversion node to integrate charges from a varying number of elements of the readout register.

2. The apparatus of claim 1, wherein the readout register includes a four phase clocking structure.

3. The apparatus of claim 1, wherein:
the sensor is a CCD line sensor; and
each pixel includes at least one of a photodiode and a pinned photodiode.

4. The apparatus of claim 1, wherein:
the plurality of pixels includes central pixels and end pixels;
the central pixels are characterized by a first photo responsive area; and
the end pixels are characterized by a second photo responsive area, the first photo responsive area being smaller than the second photo responsive area.

5. The apparatus of claim 1, wherein:
the plurality of pixels includes central pixels and end pixels;
the central pixels are characterized by a first quantum efficiency; and
the end pixels are characterized by a second quantum efficiency, the first quantum efficiency being smaller than the second quantum efficiency.

6. The apparatus of claim 5, wherein the central pixels include an over layer of light absorbing material that is not included in the end pixels.

7. The apparatus of claim 1, wherein the sensor and the control circuitry are formed on one integrated circuit silicon wafer.

8. The apparatus of claim 1, wherein:
the sensor is formed on one integrated circuit silicon wafer; and
the sensor and the control circuitry are mounted on one printed wiring assembly.

9. An apparatus comprising a source of spectral light indicative of a sample to be measured, a camera to sense a spectrum, and a chromatic dispersion device to spatially separate light from the sample to be measured into the spectrum, wherein the camera includes:
a sensor that is one of a CCD line sensor and a CCD TDI sensor, the sensor including a plurality of pixels, a conversion node, a readout register coupled to the conversion node and an output buffer coupled to the conversion node;
an analog to digital converter coupled to the output buffer; and
control circuitry coupled to the sensor and the analog to digital converter, the control circuitry being capable of shifting the readout register to transfer charges through the conversion node and through the output buffer to the analog to digital converter, the control circuitry being further capable of integrating a varying number of digital outputs from the analog to digital converter, the integrated digital outputs corresponding to a varying number of elements of the readout register.

10. The apparatus of claim 9, wherein the readout register includes a four phase clocking structure.

11. The apparatus of claim 9, wherein:
the sensor is a CCD line sensor; and
each pixel includes at least one of a photodiode and a pinned photodiode.

12. The apparatus of claim 9, wherein:
the plurality of pixels includes central pixels and end pixels;
the central pixels are characterized by a first photo responsive area; and
the end pixels are characterized by a second photo responsive area, the first photo responsive area being smaller than the second photo responsive area.

13. The apparatus of claim 9, wherein:
the plurality of pixels includes central pixels and end pixels;
the central pixels are characterized by a first quantum efficiency; and
the end pixels are characterized by a second quantum efficiency, the first quantum efficiency being smaller than the second quantum efficiency.

14. The apparatus of claim 13, wherein the central pixels include an over layer of light absorbing material that is not included in the end pixels.

15. The apparatus of claim 9, wherein the control circuitry includes a microprocessor.

16. A method comprising:
shifting a readout register of a sensor to transfer charges onto a conversion node, the sensor being one of a CCD line sensor and a CCD TDI sensor; and
controlling a reset gate of the sensor to reset the conversion node at varying intervals enabling the conversion node to integrate charges from a varying number of elements of the readout register.

17. The method of claim 16, wherein the controlling of the reset gate includes:
enabling charge from only one readout register element to be held on the conversion node before the conversion node is reset when the one readout register element corresponds to a central pixel of the sensor; and
enabling charges from at least two other readout register elements to be combined on the conversion node before the conversion node is reset when the other register elements correspond to non central pixels of the sensor.

18. The method of claim 16, wherein:
the shifting and controlling constitutes imaging of a sample light to be measured; and
the method further comprising imaging a reference light by shifting the readout register and controlling the reset gate.

19. The method of claim 16, wherein:
the shifting of the readout register shifts central elements and end elements;
the central elements readout pixels that are characterized by a first photo responsive area; and
the end elements readout pixels that are characterized by a second photo responsive area, the first photo responsive area being smaller than the second photo responsive area.

20. The method of claim 16, wherein:
the shifting of the readout register shifts central elements and end elements;
the central elements readout pixels that are characterized by a first quantum efficiency; and
the end elements readout pixels that are characterized by a second quantum efficiency, the first quantum efficiency being smaller than the second quantum efficiency.

* * * * *